United States Patent [19]

Sasaki

[11] Patent Number: 5,208,904
[45] Date of Patent: May 4, 1993

[54] DATA PROCESSING APPARATUS AND METHOD FOR PREPARING DATA REPRESENTATIVE OF SUPPLEMENTAL FIGURE ATTACHED TO BASIC FIGURE REPRODUCED ON OUTPUT MEDIUM

[75] Inventor: Ichiro Sasaki, Nagoya, Japan

[73] Assignee: Brother Kogyo Kabushiki Kaisha, Nagoya, Japan

[21] Appl. No.: 794,665

[22] Filed: Nov. 18, 1991

Related U.S. Application Data

[63] Continuation of Ser. No. 486,852, Mar. 1, 1990, abandoned.

[30] Foreign Application Priority Data

Mar. 7, 1989 [JP] Japan .................................. 1-54576

[51] Int. Cl.⁵ .......................................... G06F 15/626
[52] U.S. Cl. .................................... 395/143; 395/140; 395/141; 395/142; 340/747
[58] Field of Search ............... 395/140, 141, 142, 143; 340/747, 750

[56] References Cited

U.S. PATENT DOCUMENTS

| 4,029,947 | 6/1977 | Evans et al. | 235/151 |
| 4,620,287 | 10/1986 | Yam | 364/518 |
| 4,937,743 | 6/1990 | Rassman et al. | 364/401 |

FOREIGN PATENT DOCUMENTS 61-8434 3/1986 Japan .

Primary Examiner—Gary V. Harkcom
Assistant Examiner—Phu K. Nguyen
Attorney, Agent, or Firm—Oliff & Berridge

[57] ABSTRACT

A data processing apparatus having a basic figure processing device for preparing basic figure data for reproducing at least one basic figure on a recording medium, a display screen or other output medium, and supplemental figure processing device for determining a supplemental figure attached to the basic figure or figures and preparing supplemental figure data necessary to output the supplemental figure on the output medium. The supplemental figure processing device is adapted to prepare standard supplement figure data necessary to attach at least one standard supplement figure to the basic figure or figures in a predetermined relationship therewith. Each standard supplement figure is specified by a characteristic of the basic figure or figures and contains the supplemental figure. The supplemental figure processing device selects a portion of the standard supplement figure data which corresponds to a portion of the standard supplement figure or figures which satisfies a predetermined condition, so that the supplemental figure data consists of the selected portion of the standard supplement figure data.

20 Claims, 8 Drawing Sheets

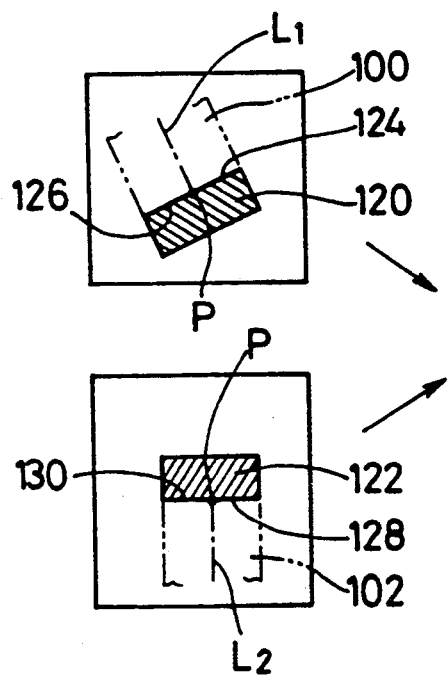
FIG. 4a
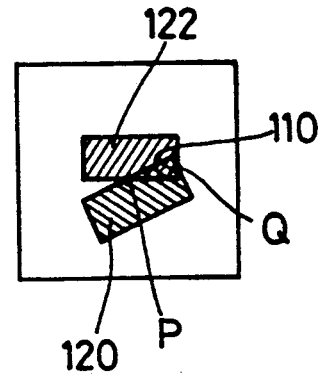
FIG. 4c
FIG. 4b
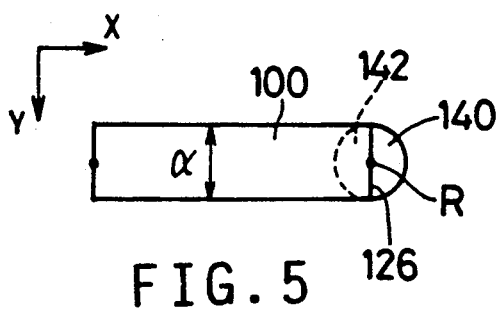
FIG. 5

DATA PROCESSING APPARATUS AND METHOD FOR PREPARING DATA REPRESENTATIVE OF SUPPLEMENTAL FIGURE ATTACHED TO BASIC FIGURE REPRODUCED ON OUTPUT MEDIUM

This is a continuation of application Ser. No. 07/486,852 filed Mar. 1, 1990 now abandoned.

BACKGROUND OF THE INVENTION

1. Field of the Invention

The present invention relates to a data processing apparatus and method for preparing data representative of a plane figure or visible representation, and more particularly to an apparatus capable of automatically preparing supplemental figure data representative of a supplemental figure which is attached to a basic figure or figures to be reproduced on a paper, display screen or other output medium, so that the supplemental figure connects the two basic figures in a continuous and smooth manner, or transform. the basic figure.

2. Discussion of the Prior Art

Generally, a data processing apparatus as described above includes basic figure processing means and supplemental figure processing means. The basic figure processing means is adapted to prepare basic figure data for outputting or reproducing a basic figure on an output medium, and the supplemental figure processing device is adapted to determine a supplemental figure attached to the basic figure and prepare supplemental figure data necessary to output the supplemental figure on the output medium.

A visible representation to be reproduced on the output medium may consist of a multiplicity of basic figures, each of which has a reference line along which the basic figure extends with a given width. For example, two rectangular basic figures are connected to each other such that a middle point on one of the opposite short sides of one of the two basic figures is aligned with that of the other basic figure. The middle point is an intersection between the relevant short side and the reference line of each rectangular basic figure. The visible representation constituted by the thus connected two basic figures is reproduced on the output medium.

In the above case, there may be formed a V-shaped crevice or gap between the connected short sides of the two rectangular basic figures. Where the two basic figures are connected such that an angle formed by their reference lines is in the neighborhood of 180°, the area of the crevice or gap is very small and may disappear when the connected figures are reproduced, or the crevice of the reproduced figures cannot be perceived by the naked eye. Where the angle formed by the reference lines is relatively small, the crevice may be perceived by the naked eye, and the reproduced two basic figures have a poorly connected appearance, or poor continuity at the connection. To eliminate the generation of such a crevice or gap between the connected ends of the two basic figures, it is proposed to provide the data processing apparatus with means for automatically obtaining a supplemental figure which is attached to the basic figures, so as to eliminate the crevice.

As a typical example of the supplemental figure, a sectorial shape as indicated at 98 in FIG. 12 is known. Conventionally, this sectorial supplemental figure 98 is obtained by working out by arithmetic operation an arc whose center is located at an intersection P (reference intersection) between reference lines L1, L2 of two basic figures 100 and 102, and which is contiguous with corresponding long sides 104, 106 of the basic figures.

Also known as the supplemental figure is a quadrilateral as indicated at 110 in FIG. 13. This quadrilateral supplemental figure 110 is conventionally obtained by calculating an intersection Q between extension lines 112, 114 of the corresponding long sides 104, 106 of the two basic figures 100 and 102, and working out by arithmetic operation a figure which is defined by the intersection Q, extension lines 112, 114 and basic figures 100, 102.

Thus, the conventional apparatus requires a comparatively complicated arithmetic operation to work out the appropriate supplemental figure, which results in a considerably long time for preparing figure data representative of a desired visible representation consisting of two or more connected basic figures to which the supplemental figure is attached.

A similar problem is encountered where a basic figure is transformed. For instance, a rectangular basic figure is transformed by rounding one of its longitudinal ends by attaching a semicircular supplemental figure to that longitudinal end.

SUMMARY OF THE INVENTION

It is therefore a first object of the present invention to provide a data processing apparatus capable of efficiently preparing supplemental figure data representative of a supplemental figure attached to at least one basic figure.

A second object of the present invention is to provide a data processing method of efficiently preparing the supplemental figure data indicated above.

The first object may be achieved according to the principle of the present invention, which provides a data processing apparatus having a basic figure processing device for preparing basic figure data for reproducing at least on basic figure on a recording medium, a display screen or other output medium, and a supplemental figure processing device for determining a supplemental figure attached to the basic figure or figures and preparing supplemental figure data necessary to output the supplemental figure on the output medium. The supplemental figure processing device is adapted to prepare standard supplement figure data necessary to attach at least one standard supplement figure to the basic figure or figures in a predetermined relation therewith. Each standard supplement figure is specified by a characteristic of the basic figure or figures and contains the supplemental figure. The supplemental figure processing device selects a portion of the standard supplement figure data which corresponds to a portion of the standard supplement figure or figures which satisfies a predetermined condition, so that the supplemental figure data consists of the selected portion of the standard supplement figure data.

The second object may be achieved according to another aspect of the invention, which provides a data processing method for preparing supplemental figure data necessary to output a supplemental figure to be attached to at least one basic figure which is represented by basic figure data and reproduced on an output medium such as a recording medium and a display screen, said method comprising the steps of: determining at least one standard supplement figure based on a characteristic of the at least one basic figure, each of the at least one standard supplement figure containing the supplemental figure; preparing standard supplement figure data necessary to attach the at least one standard supplement figure to the at least one basic figure in a predetermined relationship therewith; and selecting a portion of the standard supplement figure data which corresponds to a portion of the at least one standard supplement figure which satisfies a predetermined condition, so that the supplemental figure data consists of the selected portion of the standard supplement figure data.

In the data processing apparatus and method of the present invention as described above, the supplemental figure data is not directly prepared, but a standard supplement figure or figures specified by a characteristic of the basic figure or figures and containing the supplemental figure is/are first determined, and the standard supplement figure data necessary to attach the standard supplement figure or figures to the basic figure in the predetermined relation is prepared. The supplemental figure data is indirectly prepared by selecting a portion of the standard supplement figure data which corresponds to the portion of the standard supplement figure or figures that satisfies the predetermined condition. As described later in detail, each standard supplement figure may be a relatively simple figure such as a circle, an ellipse and a rectangle. Accordingly, the standard supplement figure data may be comparatively easily prepared, and the selection or extraction of the supplemental figure data from the standard supplement figure data as the supplemental figure data may be comparatively easily accomplished.

Therefore, the supplemental figure data for a relatively complicated supplemental figure may be comparatively easily prepared, with a reduced data processing time.

BRIEF DESCRIPTION OF THE DRAWINGS

The above and other objects, features and advantages of the present invention will be better understood by reading the following detailed description of the present invention and the description of presently preferred embodiments of the invention, when considered in connection with the accompanying drawings, in which:

FIGS. 1, 2, 3, 4(a), 4(b), 4(c) and 5 are views illustrating examples of visible representations to which the principle of the present invention is applicable;

DETAILED DESCRIPTION OF THE INVENTION

Figure 1:
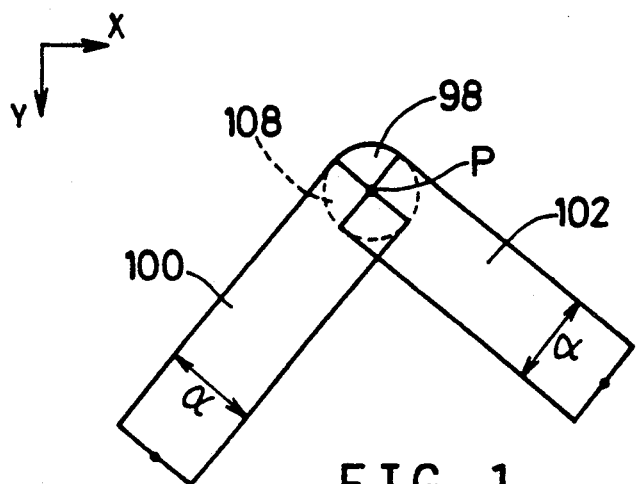

Referring first to FIG. 1, there is shown a visible representation including a sectorial supplemental figure 98 which connects a first rectangular basic figure 100 and a second rectangular basic figure 102 which have the same width $a$. The visible representation is superimposed on a coordinate system having mutually perpendicular X and Y axes. The coordinate system corresponds to a recording area on a recording medium or a display area on a display screen. For easy understanding, it is assumed that the resolution of an image reproduced on the recording or display screen in the X-axis direction is the same as that in the Y-axis direction.

The sectorial supplemental figure 98 is included or contained in a circle 108 whose diameter is equal to the width $a$ of the first and second basic figures 100, 102. This is true irrespective of the angle formed by the direction of extension of the two basic figures 100, 102, or the angle at which the basic figures 100, 102 are connected to each other such that the corresponding short sides of the rectangles of the two basic figures 100, 102 intersect each other. The middle points on the intersecting short sides of the two rectangles are aligned with each other, at a reference intersection P. When the circle 108 is located such that the center of the circle 108 is aligned with the reference intersection P, the sectorial supplemental figure 98 attached to the connected two basic figures 100, 102 is defined by an area of the circle 108 which is not superposed on or overlapped by the basic figures 100, 102.

In this case, the supplemental figure data representative of the sectorial supplemental figure 98 is prepared in the following manner, for example, by a data converting apparatus which includes supplemental figure processing means:

The supplemental figure processing means (which will be described with respect to the presently preferred embodiments of the invention) is provided with dot data memory means which has a plurality of memory locations corresponding to the picture elements on the output medium (or picture elements on the coordinate system indicated above). The memory locations of the dot data memory means store respective data bits which indicate the absence or presence of image dots at the positions of the corresponding picture elements on the output medium. For instance, the dot data bits are "0" for the picture elements at which no image dots are formed, and "1" for the picture elements at which the image dots are formed. The supplemental figure processing means is adapted to prepare first basic-figure dot data representative of the first basic figure 100, second basic-figure dot dat representative of the second basic figure 102, and circle dot data representative of the circle 108. The prepared first and second basic-figure dot data and circle dot data are stored in the dot data memory. The circle dot data is a sum of the data representative of the sectorial supplemental figure 98, and data representative of the area of the circle 108 which is superposed on or overlapped by the basic figures 100, 102. This means that by storing the circle dot data and the first and second basic-figure dot data into the dot data memory means, the dot data representative of the sectorial supplemental figure 98 is eventually stored in the dot data memory means, together with the first and second basic-figure dot data. Thus, the supplemental-figure dot data representative of the sectorial supplemental figure 98 is indirectly prepared by the supplemental figure processing means.

The first and second basic-figure dot data may be prepared by exclusive basic figure processing means. In this case, the supplemental figure processing means is not assigned to prepare the basic-figure dot data.

In the above example, the circle 108 specified by the width α which is a characteristic of the basic figures 100, 102 is the standard supplement figure, and the circle dot data representative of the circle 108 is the standard supplement figure data. The predetermined relationship between the standard supplement figure and the basic figures is such that the circle 108 is attached to the basic figures 100, 102, with the center of the circle 108 aligned with the reference intersection P. The predetermined condition in which a portion of the standard supplement figure data is selected as the supplemental figure data is that a portion of the standard supplement figure which corresponds to the supplemental figure is superposed on neither the first basic figure 100 nor the second basic figure 102. Certainly, the supplemental-figure dot data representative of the sectorial supplemental figure 98 is the supplemental figure data.

Figure 2:
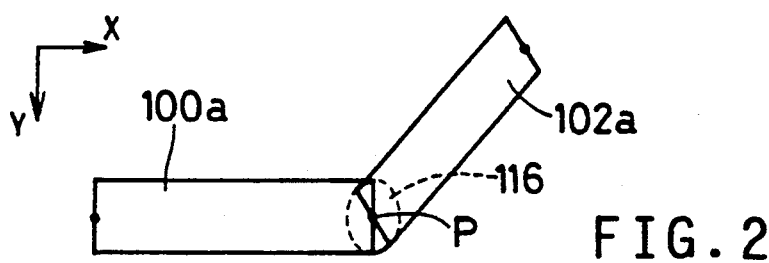

In the case described above, the magnification of the figures in the X-axis and Y-axis directions is the same. However, the principle of the invention may be practiced even where the magnification in the X-axis direction is different from that in the Y-axis direction. For example, an ellipse 116 is used as the standard supplement figure, as shown in FIG. 2, where the magnification in the Y-axis direction is higher than that in the X-axis direction. In this case, a first rectangular basic figure 100a and a second parallelogrammic basic figure 102a may be connected to each other, without a crevice formed between the connected ends of the basic figures 100a, 102a. The elliptical standard supplement figure 116 exists for any angle at which the two basic figures 100a, 102a are connected such that the center of the ellipse 116 is aligned with the reference intersection P of the basic figures 100a, 102a. The ellipticity of the ellipse 116 corresponds to the magnification ratio of the X and Y axes. Namely, the ellipse 116 is positioned such that the major axis is parallel to one of the X and Y axes which has the higher magnification. In the present specific example, the major axis of the ellipse 116 is parallel to the Y axis and has a length equal to the width of the rectangular basic figure 100a.

Referring next to FIGS. 3 and 4(a)–4(c), there will be described an example in which the two rectangular basic figures 100, 102 are continuously and smoothly connected to each other by a quadrilateral supplemental figure 110.

In this case, the quadrilateral 110 is defined by a first rectangle 120 and a second rectangle 122 which extend from respective short sides 126, 130 of the first and second basic figures 100, 102, over the width equal to the width α of the basic figures, in the direction of the reference lines L1, L2. As indicated in FIGS. 4(a) and 4(b), one 124 of the opposite long sides of the first rectangle 120 is aligned with the short side 126 of the first basic figure 100, while one 128 of the opposite long sides of the second rectangle 122 is aligned with the short side 130 of the second basic figure 102. As shown in FIG. 4(c), the first and second rectangles 120, 122 are partially overlapped with each other, so as to define the quadrilateral supplemental figure 110.

The supplemental figure data representative of the quadrilateral supplemental figure 110 is prepared, for example, in the following manner, by the supplemental figure processing means of the data converting apparatus:

The supplemental figure processing means is provided with first dot data memory means and second dot data memory means, which are similar to the dot data memory described above with respect to FIG. 1. The supplemental figure processing means prepares first rectangle dot data representative of the first rectangle 120, and second rectangle do data representative of the second rectangle 122, and stores the prepared first and second rectangle dot data into the respective first and second dot data memory means. The supplemental figure processing means is adapted to select, as the supplemental-figure dot data, data bits of the first and second rectangle dot data, which are stored in the corresponding memory locations of the first and second dot data memory means and which indicate the presence of image dots at the positions of the corresponding picture elements.

In the above example, the first and second rectangles 120, 122 specified by the width which is a characteristic of the basic figures 100, 102 are the standard supplement figure, and the first and second rectangle dot data representative of the two rectangles 120, 122 are the standard supplement figure data. The predetermined relation between the standard supplement figure and the basic figures is such that the two rectangles 120, 122 are attached to the basic figures 100, 102, with the long sides 124, 128 of the rectangles 120, 122 aligned with the respective short sides 126, 130 of the basic figures 100, 102. The predetermined condition in which a portion of the standard supplement figure data is selected as the supplemental figure data is that portions of the first and second rectangles 120, 122 are superposed on or overlapped by each other. Certainly, the supplemental-figure dot data representative of the quadrilateral supplemental figure 110 is the supplemental figure data.

The rectangular basic figures 100, 102 may be replaced by parallelogrammic figures. In this case, the first and second rectangles 120, 122 are replaced by parallelograms.

Reference is now made to FIG. 5, which shows an example in which the rectangular basic figure 100 is rounded at one short side 126, by attaching thereto a semicircular supplemental figure 140.

In the present case, the semicircular supplemental figure 140 is contained or included in a circle 142 whose diameter is equal to the width α of the basic figure 100. The circle 142 is positioned such that the center of the circle 142 is aligned with a middle point R on the short side 126 of the basic figure 100. A portion of the circle 142 which is not superposed on the basic figure 100 serves as the semicircular supplemental figure 140.

For example, the supplemental figure data representative of the semicircular supplemental figure 140 may be prepared in the following manner:

The supplemental figure processing means prepares the basic-figure dot data for the basic figure 100, circle dot data representative of the circle 142, and stores the prepared dot data into the dot data memory means as described above. The circle dot data is a sum of the data representative of the semicircular supplemental figure 140, and data representative of the area of the circle 142 which is superposed on or overlapped by the basic figure 100, 102. This means that by storing the circle dot data and the basic-figure dot data of the basic figure 100 into the dot data memory means, the dot data representative of the semicircular supplemental figure 140 is eventually stored in the dot data memory means, together with the basic-figure dot data.

In the above example, the circle 142 specified by the width α which is a characteristic of the basic figure 100 is the standard supplement figure, and the circle dot data representative of the circle 142 is the standard supplement figure data. The predetermined relation between the standard supplement figure and the basic figure is such that the circle 142 is attached to the basic figure 100, with the center of the circle 142 aligned with the reference intersection R. The predetermined condition in which a portion of the standard supplement figure data is selected as the supplemental figure data is that a portion of the standard supplement figure which corresponds to the supplemental figure is not superposed on the basic figure 100. Certainly, the supplemental-figure dot data representative of the semicircular supplemental figure 140 is the supplemental figure data.

DETAILED DESCRIPTION OF THE PREFERRED EMBODIMENTS

Figure 6:
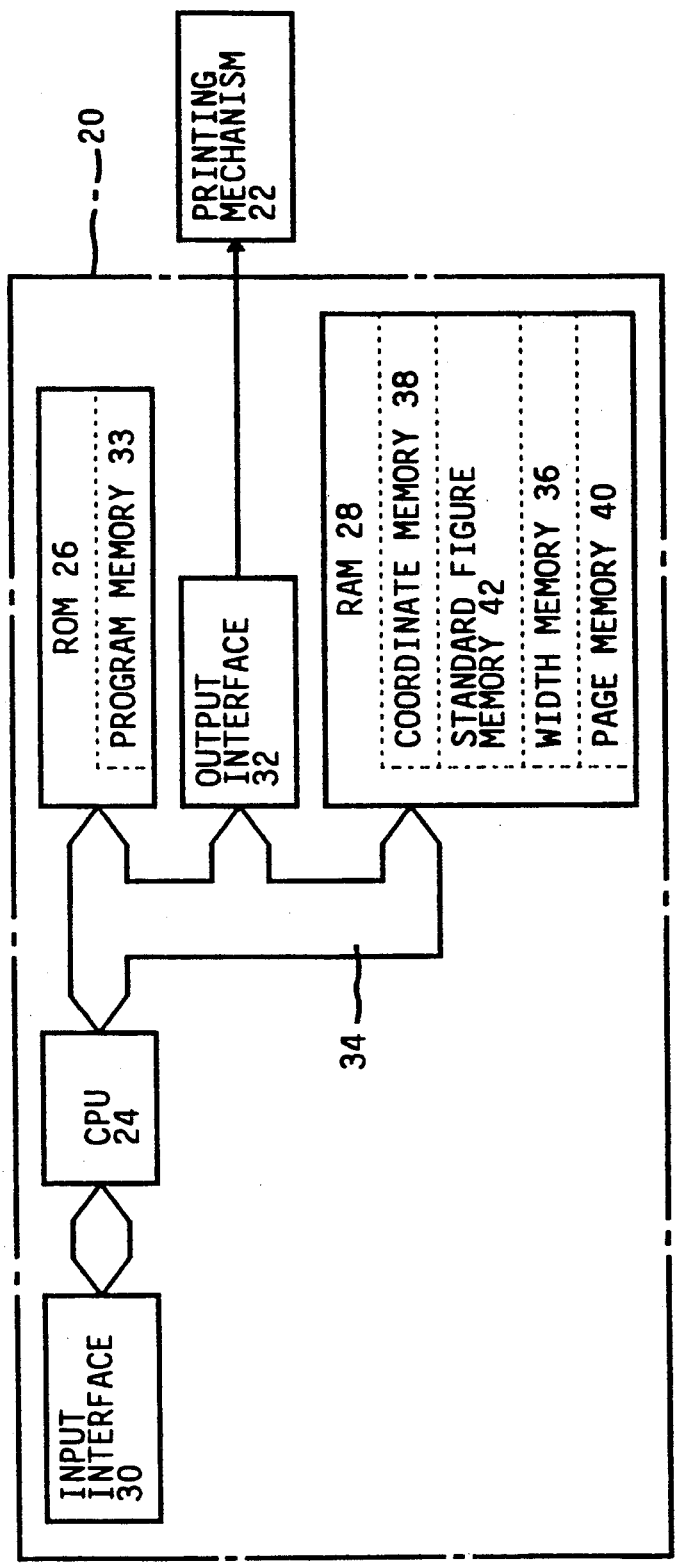
FIG. 6 is a schematic block diagram showing an electric control system of a laser printer constructed according to one embodiment of the invention.

Referring to FIG. 6, there is illustrated a laser printer which incorporates one embodiment of a data converting apparatus of the present invention. The laser printer has a main control unit 20 principally constituted by a computer, and a printing mechanism 22 for printing a visible representation on an output medium in the form of a recording medium. The main control device 20 includes a central processing unit (CPU) 24, a read-only memory (ROM) 26, a random-access memory (RAM) 28, an input interface 30, an output interface 32, and a bus 34 for interconnecting the components indicated above. The main control device 20 is connected through the input interface 30 to an external input device, and through the output interface 32 to the printing mechanism 22.

The main control device 20 receives from the external input device input data which represent a multiplicity of rectangular or square basic figures as superimposed on an X-Y coordinate system in which the X and Y axes are perpendicular to each other. Each basic figure has a reference line along which two opposite sides (long sides in the case of rectangles) extend with a predetermined width α, such that the reference line is the centerline of the square or rectangle. Described specifically, the input data received from the external input device comprise coordinate data representative of the coordinates (Psx, Psy) of a start point of the reference line of each basic figure, coordinates (Pex, Pey) of an end point of the reference line, and width data representative of the width α of each basic figure. With the laser printer operated according to the received input data, the basic figures are printed on the recording medium, such that the start point of one basic figure represented by the coordinate data is aligned with the end point of another basic figure also represented by the coordinate data. The control device 20 is adapted to control the printing mechanism 22, so as to continuously and smoothly connect the two basic figures by forming the sectorial supplemental figure 98 at the connection of the basic figures, as indicated in FIG. 1.

Figure 7:
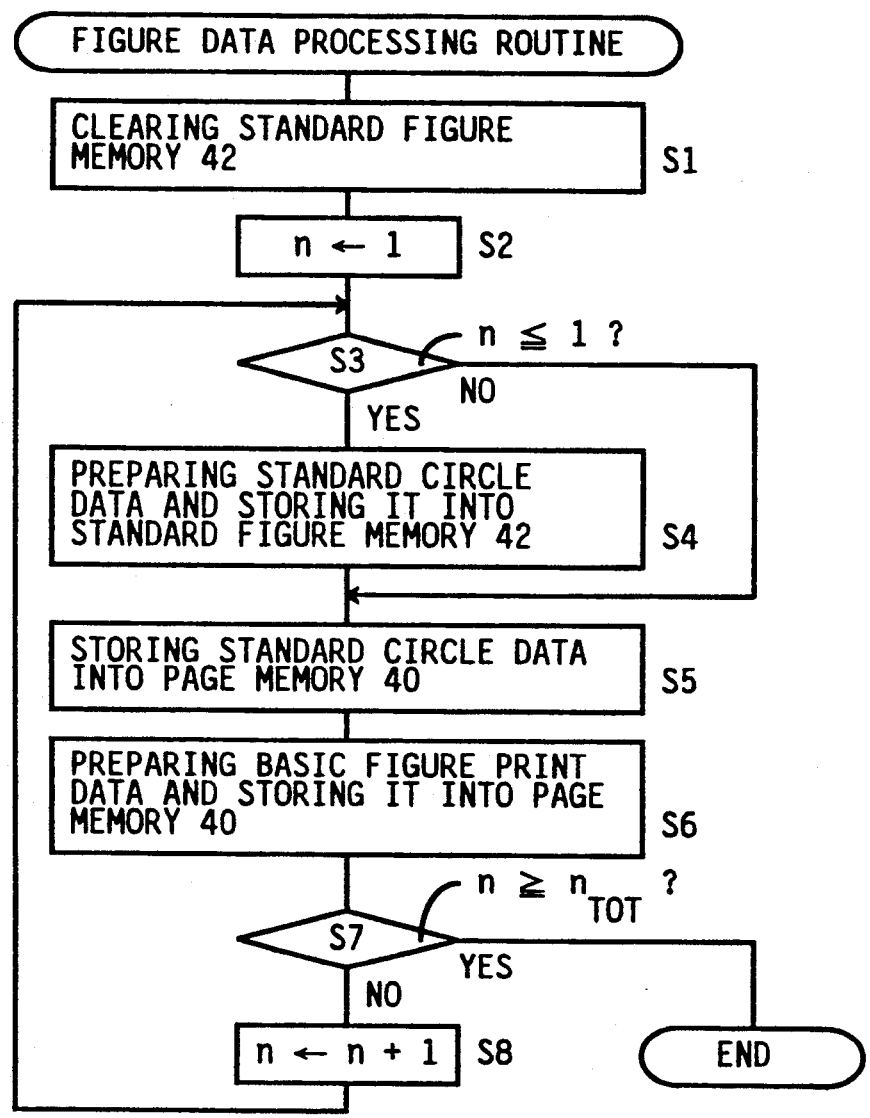
FIG. 7 is a flow chart illustrating a data processing routine stored in the control system of the laser printer of FIG. 6.

The ROM 26 includes a PROGRAM memory 33 which stores various control programs such as a figure data processing routine as illustrated in the flow chart of FIG. 7. The RAM 28 includes a WIDTH memory 36, a COORDINATE memory 38, a PAGE memory 40 and a STANDARD FIGURE memory 42. The PAGE memory 40 is a dot map memory having a multiplicity of memory locations which correspond to respective picture elements of the X-Y coordinate system or printing positions on one page of the recording medium. The memory locations of the PAGE memory 40 store respective data bits which are normally set to indicate the absence of image dots at the corresponding printing positions. That is, the data bits corresponding to the image dots to be formed on the recording medium are set to indicate the presence of the image dots. The STANDARD FIGURE memory 42 is a dot map memory having a variable storage capacity.

There will be described an operation of the laser printer.

Upon reception of a figure data processing command, the main control device 20 first executes step S1 of the flow chart of FIG. 7, in which the STANDARD FIGURE memory 42 is cleared. The control flow then goes to step S2 to set a count "n" to "1", and to step S3 to determine whether or not the count "n" is equal to "1" or smaller. These steps S2 and S3 are provided to determine whether the present control cycle is the first cycle, or not. In this specific example, the count "n" is currently "1", which means that the present control cycle is the first cycle after the figure data processing command is received. Accordingly, an affirmative decision (YES) is obtained in step S3, and the control flow goes to step S4.

In step S4, the CPU 24 prepares by arithmetic calculation standard circle data (dot data) necessary to print a standard circle (standard supplement figure) which has a diameter equal to the width α represented by the WIDTH data stored in the WIDTH memory 36. The prepared standard circle data is stored in the STANDARD FIGURE memory 42.

Step S4 is followed by step S5 in which the data bits of the standard circle data stored in the STANDARD FIGURE memory 42 are stored at the respective memory locations of the PAGE memory 40 so that the center of the standard circle is aligned with the end point of the relevant basic figure when the basic figure data dot data) representative of the basic figure is later stored in the PAGE memory 40.

Then, the control flow goes to step S6 in which the CPU 24 prepares basic figure data (dot data for printing the relevant basic figure), based on the coordinate data of the start and end points of the basic figure stored in the COORDINATE memory 38, and the WIDTH data stored in the WIDTH memory 36. The prepared basic figure data is stored in the PAGE memory 40. As a result, the dot data which represent the relevant basic figure and the semicircular supplemental figure attached to the end of the basic figure have been stored in the PAGE memory 40.

Step S6 is followed by step S7 to determine whether or not the count "n" is equal to "$n_{tot}$" or larger. The value "$n_{tot}$" represents the number of the basic figures whose coordinate data have been received from the external input device. Namely, step S7 is provided to determine whether the figure data processing routine has been completed for all the basic figures. If the number "$n_{tot}$" of the basic figures is "2" or larger, a negative decision (NO) is obtained in step S7 in the first control cycle since the present count "n" is equal to "1". Step S7 is therefore followed by step S8 in which the count "n" is incremented. The control flow then goes back to step S3, to perform the second control cycle.

In the second control cycle, a negative decision (NO) is obtained in step S3 since the present count "n" is "2", whereby the control flow goes to step S5, skipping step S4. In the second and subsequent control cycle, it is not necessary to prepare the standard circle data as the standard supplement figure data since the standard circle data were prepared and stored in the STANDARD FIGURE memory 42 in step S4 in the first control cycle. Accordingly, the data processing time is reduced. In step S5, the standard circle data is read out from the memory 42 and stored in the PAGE memory 40. In step S6, the basic figure data representative of the relevant basic figure (second basic figure) is stored in the PAGE memory 40. Thus, the PAGE memory 40 currently stores the dot data representative of the first basic figure and the relevant or second basic figure which are smoothly connected by the sectorial supplemental figure 98, and the dot data representative of the semicircle attached to the end of the second basic figure (i.e., representative of the semicircular portion of the standard circle which is not superposed on the second basic figure).

The figure data processing control cycle is repeatedly executed until the count "n" becomes equal to "$n_{tot}$", that is, until an affirmative decision (YES) is obtained in step S7. In this condition, the PAGE memory 40 stores a batch of dot data representative of a visible representation which consists of th multiple basic figures as connected to each other. When a print start command is received by the control device 20 of the laser printer, the printing mechanism 22 is operated to print the visible representation on the recording medium.

It will be understood fro the above description that the basic figure processing means is constituted by the portions of the main control device 20 which are assigned to execute steps S2 and S6-S8, and the COORDINATE, WIDTH and PAGE memories 38, 36 and 40. Further, the supplemental figure processing means is constituted by the portions of the main control device 20 which are assigned to execute steps S1 and S3-S5, and the STANDARD FIGURE and PAGE memories 42, 40. Thus, the PAGE memory 40 (dot data memory means referred to above in the DETAILED DESCRIPTION OF THE INVENTION) functions not only as part of the basic figure processing means, but also as part of the supplemental figure processing means.

Figure 3:
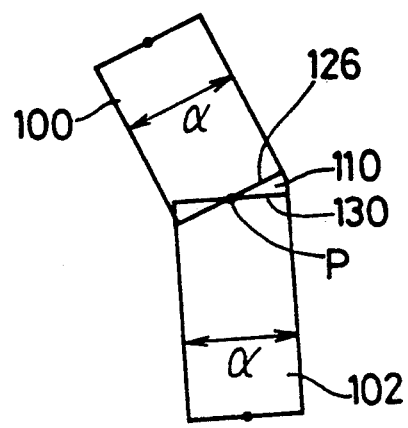
Figure 8:
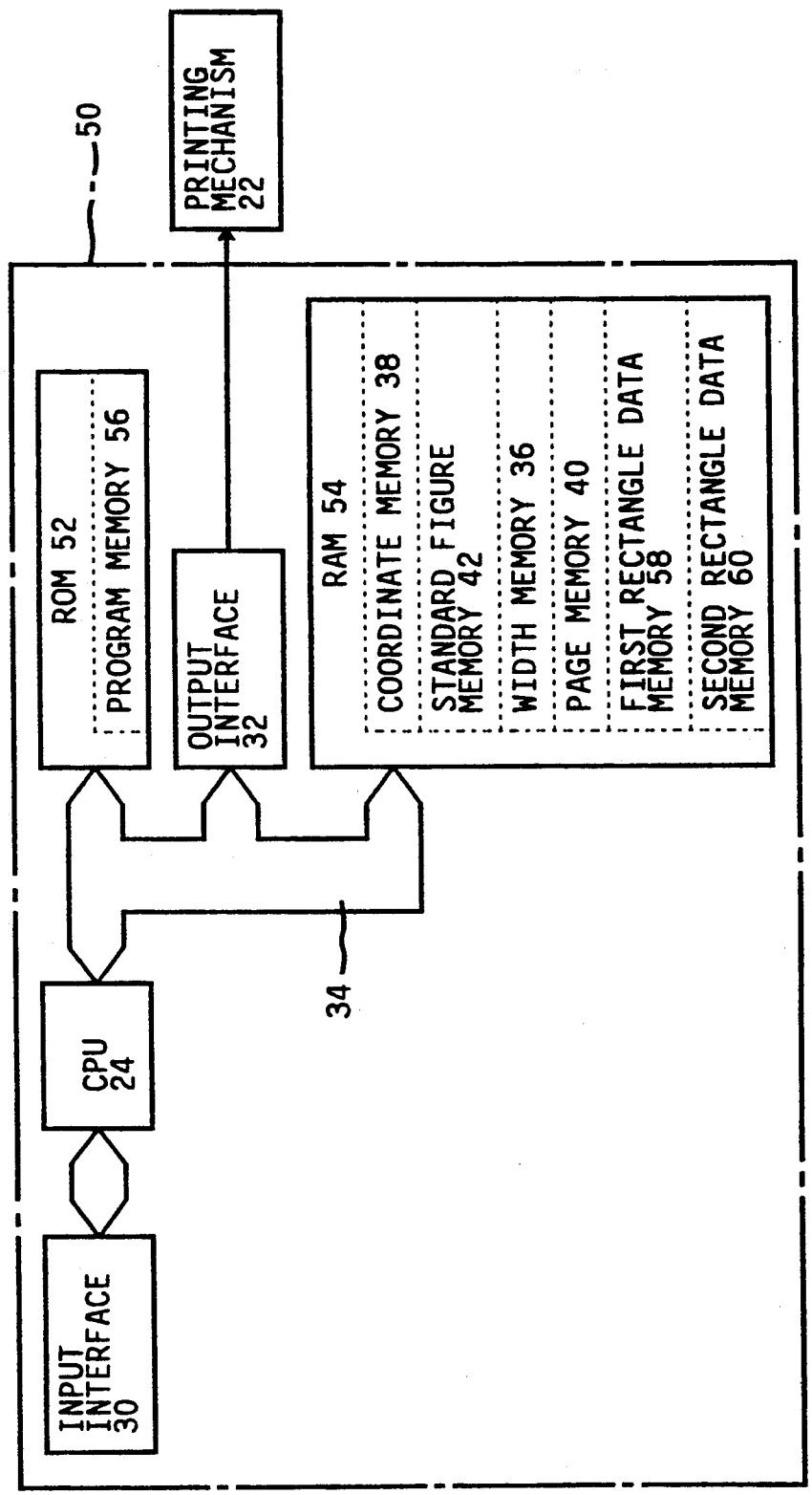
FIG. 8 is a schematic block diagram showing another embodiment of the invention also in the form of a control system of a laser printer.

Referring next to FIG. 8, another embodiment of the present invention will be described. This embodiment is adapted to continuously and smoothly connect the two basic figures by the quadrilateral supplemental figure 110 as shown in FIG. 3. As shown in FIGS. 4(a)-4(c), the n-th basic figure 100 (which is one of the two basic figures to be connected) is extended by the first rectangle 120, and the (n+1)-th basic figure 102 (the other of the two basic figures to be connected) is extended by the second rectangle 122. The quadrilateral supplemental figure 110 is defined by the mutually overlapping or superposed parts of the first and second rectangles 120, 122 when the n-th and (n+1)-th basic figures 100, 102 are connected.

The embodiment of FIG. 8 uses a main control device 50, which includes the above-described CPU 24, input interface 30, output interface 32 and bus 34. Further, the main control device 50 includes a read-only memory (ROM) 52, and a random-access memory (RAM) 54.

Figure 9:
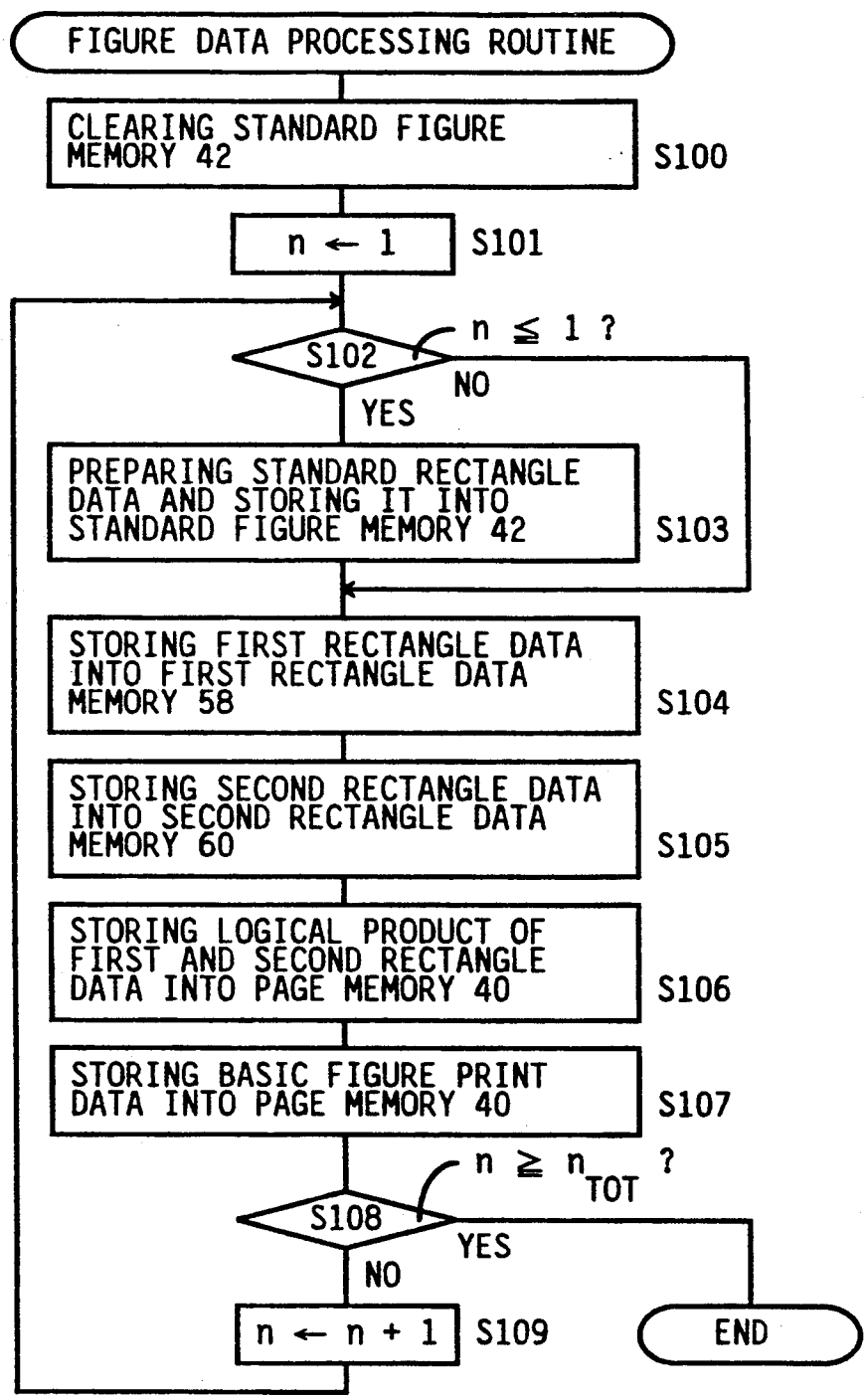
FIG. 9 is a flow chart illustrating a data processing routine stored in the control system of the printer of FIG. 8.

The ROM 52 incorporates a PROGRAM memory 56 which stores various control programs including a figure data processing routine a illustrated in the flow chart of FIG. 9. On the other hand, the RAM 54 includes the above-described COORDINATE memory 38, STANDARD FIGURE memory 42, WIDTH memory 36 and PAGE memory 40. The RAM 54 further includes a first RECTANGLE DATA memory 58 for storing first rectangle dot data representative of the first rectangle 120, and a second RECTANGLE DATA memory 60 for storing second rectangle dot data representative of the second rectangle 122. Each of these first and second RECTANGLE DATA memories 58, 60 is a dot map memory whose memory locations correspond to the picture elements at which image dots are selectively formed.

The operation of the laser printer of the present embodiment will be described by reference to the flow chart of FIG. 9.

Initially, step S100 is executed to clear the STANDARD FIGURE memory 42. Step S100 is followed by step S101 in which the count "n" is incremented to "1". The control flow then goes to step S102 to determine whether or not the count "n" is equal to "1" or smaller. In the first control cycle, the count "n" is "1", whereby an affirmative decision (YES) is obtained in step S102. Accordingly, step S102 is followed by step S103.

In step S103, the CPU 24 prepares, by arithmetic calculation, standard rectangle data (dot data) necessary to print a standard rectangle (standard supplement figure), based on the WIDTH data stored in the WIDTH memory 36. The standard rectangle has opposite sides whose length is equal to the width represented by the WIDTH data. The other opposite sides of the standard rectangle have a length which increases as a function of the width The prepared standard rectangle dot data is stored in the STANDARD FIGURE memory 42.

The standard rectangle indicated above is used as the first and second rectangles 120, 122 shown in FIGS. 4(a)-4(c). The length of the quadrilateral supplemental figure 110 is equal to a distance between the reference point P of the two rectangular basic figures 100, 102, and an intersection Q of the corresponding short sides of the first and second rectangles 120, 122. If the two basic figures 120, 122 are connected at an acute angle relative to each other, and the distance between the points P and Q (length of the quadrilateral supplemental figure 110) is larger than an upper limit determined by the above-indlcated function, the figure data processing routine of FIG. 9 is replaced by another routine for connecting the two basic figures 100, 102 by a triangular supplemental figure rather than the quadrilateral supplemental figure 110.

In step S104, the data bits of the standard rectangle data stored in the STANDARD FIGURE memory 42 are stored, as first rectangle data, at the respective memory locations of the first RECTANGLE DATA memory 58 so that the long side 124 of the standard rectangle is aligned with the corresponding short side 126 of the n-th basic figure 100 (first basic figure in this first control cycle), as indicated in FIG. 4(a). Thus, first standard supplement figure data in the form of the first rectangle data stored in the first RECTANGLE DATA memory 58 represent the first rectangle 120 indicated by hatched lines in FIG. 4(a).

In step S105, the data bits of the standard rectangle data stored in the STANDARD FIGURE memory 42 are stored, as second rectangle data, at the respective memory locations of the second RECTANGLE DATA memory 60 so that the long side 128 of the standard rectangle is aligned with the corresponding short side 130 of the (n+1)-th basic figure 102 (second basic figure in this first control cycle), as indicated in FIG. 4(b). Thus, second standard supplement figure data in the form of the second rectangle data stored in the second RECTANGLE DATA memory 60 represent the second rectangle 122 indicated by hatched lines in FIG. 4(b).

In step S106, the CPU 24 calculates a logical product of the data bits of the first and second rectangle data which are stored at the corresponding memory locations of the first and second RECTANGLE DATA memories 58, 60. The logical product is obtained for each of the picture elements on the X-Y coordinate system or for each of the printing positions on the recording medium. Where the logical product is "1", the data bit "1" is set at the corresponding memory location of the PAGE memory 40, so that an image dot is formed at the corresponding printing position. As a result, the PAGE memory 40 stores the supplemental figure data representative of the quadrilateral supplemental figure 110, which is defined by the mutually overlapping areas of the first and second rectangles 120, 122 represented by the first and second rectangle data.

Then, the control flow goes to step S107 in which the basic figure data representative of the n-th basic figure 100 is prepared and stored in the PAGE memory 40, in the same manner described with respect to the preceding embodiment of FIGS. 6 and 7. Step S107 is followed by step S108 to determine whether or not the present count "n" is equal to "$n_{tot}$" or larger. Step S107 is provided to determine whether the figure data processing routine is completed for all the basic figures. In the first control cycle, the count "n" is "1", and a negative decision (NO) is obtained in step S108, and step S109 is implemented to increment the count "n". The control flow then goes back to step S102.

In the second control cycle wherein the count "n" is "2", a negative decision (NO) is obtained in step S102, whereby the control flow goes to step S104, skipping step S104. In the second and subsequent control cycles, step S104 to prepare the standard rectangle data is skipped, since the standard rectangle data were prepared and stored in the STANDARD FIGURE memory 42 in the first control cycle, and are merely read out for use in steps S104 and S105. Thus, the data processing time is reduced.

In step S104 in the second control cycle, the first RECTANGLE DATA memory 58 is cleared, and the data bits of the standard rectangle data stored in the STANDARD FIGURE memory 42 are stored, as the first rectangle data, at the respective memory locations of the first RECTANGLE DATA memory 58 which correspond to data bits of the dot data of the n-th basic figure (second basic figure in this second control cycle) 100 where the standard rectangle is positioned such that the long side 124 of the standard rectangle is aligned with the corresponding short side 126 of the n-th basic figure 100. In step S105, the second RECTANGLE DATA memory 60 is cleared, and the data bits of the standard rectangle data stored in the STANDARD FIGURE memory 42 are stored, as the second rectangle data, at the respective memory locations of the second RECTANGLE DATA memory 60 which correspond to data bits of the dot data of the (n+1)-th basic figure (third basic figure in this second control cycle) where the standard rectangle is positioned such that the long side 128 of the standard rectangle is aligned with the corresponding short side 130 of the (n+1)-th basic figure.

Steps S106 and S107 are implemented in the same manner as in the first control cycle, and step S108 is executed to determine whether the count "n" becomes equal to "$n_{tot}$". Steps S102–S109 are repeated until an affirmative decision (YES) is obtained in step S108, namely, until the figure data processing control cycle is executed for all the basic figures.

It will be understood from the above description that the basic figure processing means is constituted by the portions of the main control device 50 which are assigned to execute steps S101 and S107–S109, and the COORDINATE, WIDTH and PAGE memories 38, 36, 40. Further, the supplemental figure processing means is constituted by the portions of the main control device 50 assigned to execute steps S100 and S102–S106, and the STANDARD FIGURE memory 42, first RECTANGLE DATA memory 58 (first dot data memory means), second RECTANGLE DATA memory 60 (second dot data memory means), and PAGE memory 40. The PAGE memory 40 functions as part of the basic figure processing means and part of the supplemental figure processing means.

In the embodiment of FIGS. 8 and 9, the first and second RECTANGLE DATA memories 58, 60 are provided for the respective first and second rectangles 100, 102, to determine the overlapping areas of the rectangles 100, 102. However, only one of the two memories 58, 60 may be used. For example, the second RECTANGLE DATA memory 60 may be eliminated if the figure data processing routine of FIG. 9 is modified as follows. Step S105 is modified such that when each of multiple data bits of the second rectangle data for the second rectangle 102 is obtained, there is calculated a logical product of the obtained data bit of the second rectangle data and the corresponding data bit ("0" or "1") stored in the first RECTANGLE DATA memory 58. If the calculated logical product is "1", a data bit "1" is set at the corresponding memory location of the PAGE memory 40. If the logical product is "0", a data bit "0" is set at the corresponding memory location of the PAGE memory 40. In this case, step S106 is eliminated.

In the preceding two embodiments, the sectorial or quadrilateral supplemental figure 98, 110 is used for continuously and smoothly connecting the adjacent two basic figures 100, 102, irrespective of the width α of the basic figures. However, it was confirmed from an experiment that the attachment of a supplemental figure to the connected two basic figures did not improve the appearance of the connection of the two basic figures as reproduced on the recording medium, if the width α is very small. In this respect, it is desirable, from the standpoint of efficient data processing, to change the data processing routine so that the the data processing for providing the supplemental figure and the printing of the supplemental figure are eliminated if the width α of the relevant basic figure or figures is smaller than a predetermined lower limit.

Figure 10:
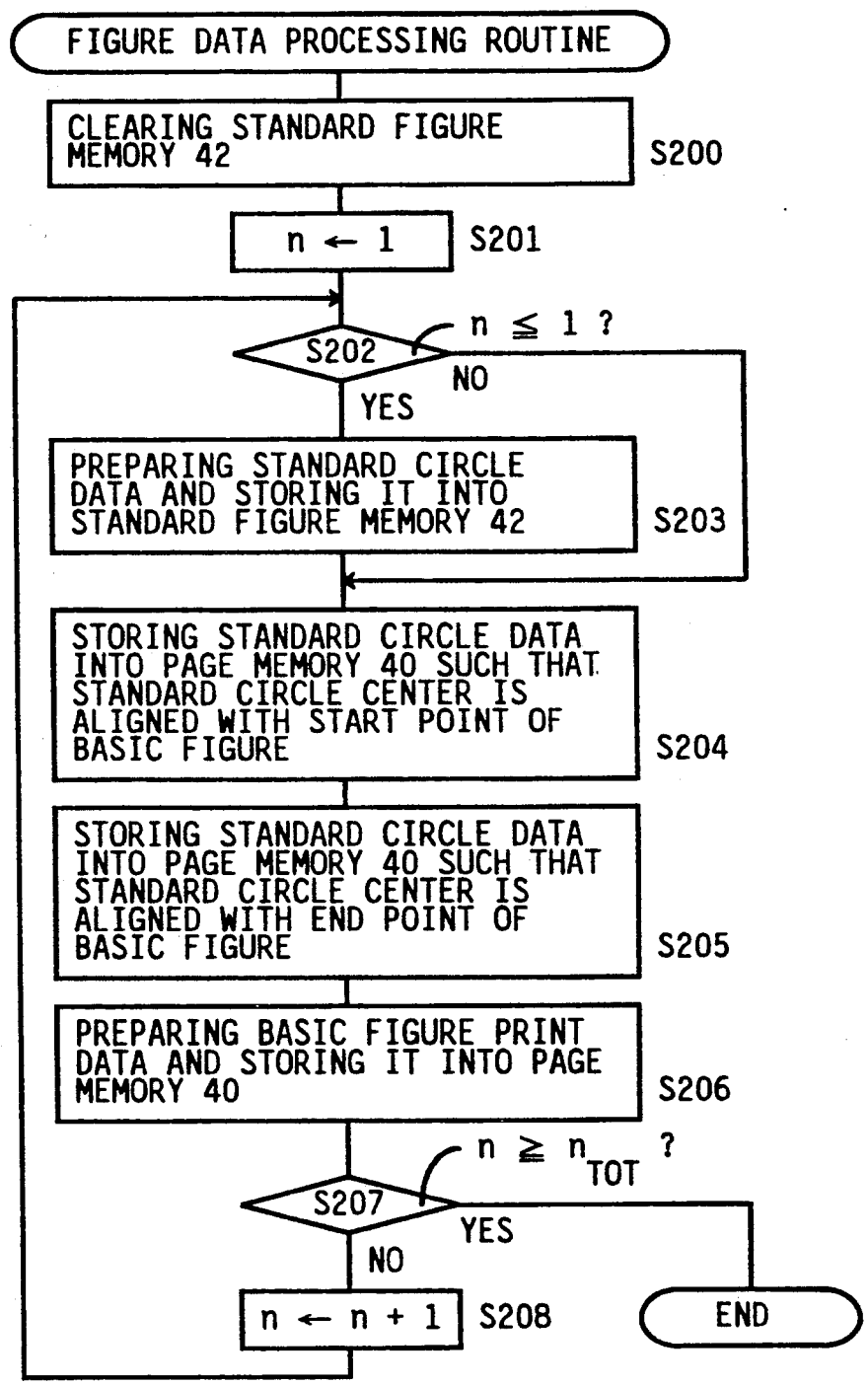
FIG. 10 is a flow chart illustrating a data processing routine used according to a further embodiment of the invention.
Figure 11:
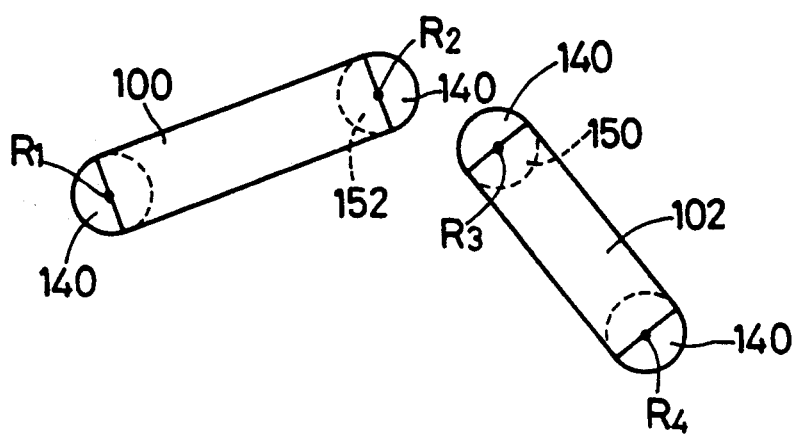
FIG. 11 is a view for explaining the manner in which the data processing routine is executed.
Figure 12:
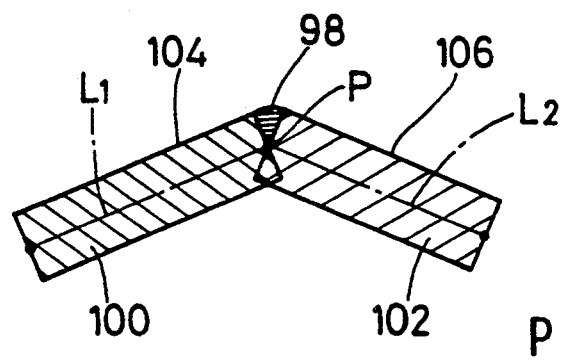
FIG. 12 is a view for explaining the manner in which a sectorial supplemental figure is obtained for continuously and smoothly connecting two basic figures in a known data processing apparatus.
Figure 13:
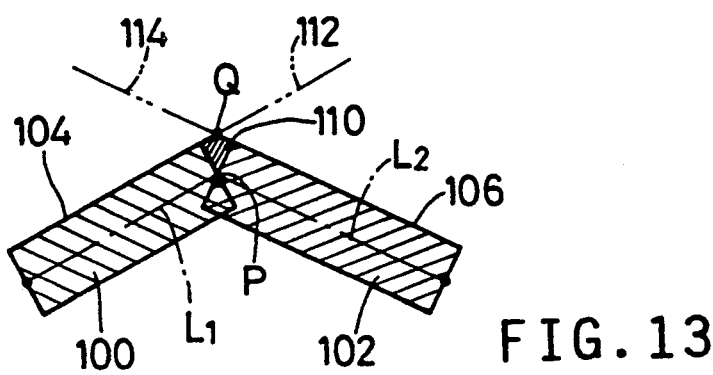
FIG. 13 is a view for explaining the manner in which a quadrilateral supplemental figure is obtained for continuously and smoothly connecting two basic figures in a known data processing apparatus.

A further embodiment of the present invention will be described by reference to figures 10 and 11. The laser printer according to this embodiment has a memory for storing coordinate data which represent a start point and an end point of each basic figure. For example, the first basic figure 100 shown in FIG. 11 has a start point designated by a first point R1 and an end point designated by a second point R2. Similarly, the second basic figure 102 has a start point designated by a third point R3 and an end point designated by a fourth point R4. The coordinate data for these points are sequentially stored in the memory of the laser printer. In this example, the first basic figure 100 is printed between the first and second points R1 and R3, while the second basic figure 102 is printed between the third and fourth points R3 and R4. However, no basic figure is printed between the second and third points R2 and R3. Each of the first and second basic figures 100, 102 is rounded at the opposite ends, by attaching a semicircular supplemental figure 140 to the ends, as indicated in FIG. 1. The laser printer is controlled by the main control device 20 shown in FIG. 6.

The present laser printer is operated as follows:

Upon reception of a figure data processing command, step S200 is executed to clear the STANDARD FIGURE memory 42. Then, the control flow goes to step S201 to set the count "n" to "1", and step S202 to determine whether or not the count "n" is equal to "1" or smaller, namely, whether or not the present control cycle is the first control cycle. In this first control cycle, an affirmative decision (YES) is obtained in step S202, and step S203 is executed.

In step S203, the CPU 24 prepares standard circle data (dot data) necessary to print a standard circle (standard supplement figure) whose diameter is equal to the width $\alpha$ represented by the WIDTH data stored in the WIDTH memory 36. The prepared standard circle data is stored in the STANDARD FIGURE memory 42.

In step S204, the data bits of the standard circle data are stored, as standard supplement figure data, at the memory locations of the PAGE memory 40 so that the center of the standard circle is aligned with the start point of the n-th basic figure (first basic figure in this first control cycle), when the basic figure data representative of the basic figure is later stored in the PAGE memory 40. In step S205, the data bits of the standard circle data are stored, also as standard supplement figure data, at the memory locations of the PAGE memory 40 which correspond to the data bits of the dot data of the n-th basic figure where the standard circle is positioned such that the center of the standard circle is aligned with the end point of the n-th basic figure.

In step S206, the CPU 24 prepares the basic figure print data representative of the n-th basic figure, in the same manner as described above with respect to step S6 of FIG. 7. The prepared basic figure print data are stored in the PAGE memory 40. In this condition, therefore, the PAGE memory 40 stores the dot data representative of the n-th basic figure, and the dot data representative of the two semicircular supplemental figures 140, 140 aligned at the start and end points R1, R2 of the n-th basic figure. Then, the control flow goes to step S207 to determine whether or not the count "n" becomes equal to "$n_{tot}$", namely, whether the figure data processing control cycle is completed for all the basic figures to be printed. In the first control cycle, a negative decision (NO) is obtained in step S207, whereby step S208 is implemented to increment the count "n". The control flow then goes back to step S202.

In the second control cycle wherein the count "n" is "2", a negative decision (NO) is obtained in step S202, whereby the control flow goes to step S204, skipping step S203. This step S203 is skipped since the standard circle data used in the second and subsequent control cycles were already prepared and calculated in the STANDARD FIGURE memory 42. It is not necessary to calculate and prepare the standard circle data in each control cycle, and the data processing time may be reduced.

Then, steps S204, S205 and S206 are executed for the second basic figure 102. If there exists the third basic figure, a negative decision (NO) is obtained in step S207.

The figure data processing control cycle is repeatedly executed until an affirmative decision (YES) is obtained in step S207.

It will be understood from the above description of the present embodiment that the basic figure processing means is constituted by the portions of the main control device 20 which are assigned to execute steps S201 and S206-S208, and the COORDINATE, WIDTH and PAGE memories 38, 36, 40. Further, the supplemental figure processing means is constituted by the portions of the main control device 20 assigned to execute steps S203-S205, and the STANDARD FIGURE memory 42 and PAGE memory 40. The PAGE memory 40 serves as part of both the basic figure processing means and the supplemental figure processing means.

While the present invention has been described in the presently preferred embodiments, it is to be understood that the invention is not limited to the details of the illustrated embodiments, but may be embodied with various changes, modifications and improvements. For instance, the present invention is applicable to a printer other than the laser printer and to a CRT display device.

What is claimed is:

1. A data processing apparatus comprising:

basic figure processing means for preparing basic figure data on an output medium such as recording medium and a display screen;

program memory means for storing a control program defining at least one standard supplement figure with respect to a shape and a size thereof and a relative position thereof to said at least one basic figure so as to partially overlap said at least one basic figure in a predetermined relation therewith;

standard supplement figure processing means for determining, by utilizing said control program and a characteristic of said at least one basic figure, a size and a position of said at least one standard supplement figure, and preparing standard supplement figure data necessary to output said at least one standard supplement figure on said output medium;

each of said basic figure data and said standard supplement figure data consisting of inside-indicating data indicating an area inside a corresponding one of said basic figure and said standard supplement figure, and outside-indicating data indicating an area outside said corresponding one of the basic figure and the standard supplement figure; and output figure processing means for processing said basic figure data and said standard supplement figure data into output figure data used to output as an output figure the overlapped at least one basic figure and at least one standard supplement figure, such that an area inside said output figure is indicated by said inside-indicating data and an area outside said output figure is indicated by said outside-indicating data;

said output figure containing at least one supplemental figure which is a portion of said at least one standard supplemental figure.

2. A data processing apparatus according to claim 1, wherein said standard supplement figure processing means comprises determined means for determining a size and a position of each of said at least one standard supplement figure based on said control program and said characteristic of said at least one basic figure, and preparing means for preparing said standard supplement figure data representative of each determined standard supplement figure.

3. A data processing apparatus according to claim 2, wherein said at least one standard supplement figure consists of a single standard supplement figure determined by said determining means, and said preparing means prepares the standard supplement figure data representative of said single standard supplement figure.

4. A data processing apparatus according to claim 1, wherein said at least one basic figure consists of a single basic figure, and said basic figure processing means prepares the basic figure data representative of said single basic figure.

5. A data processing apparatus according to claim 1, wherein said at least one basic figure consists of two basic figures connected to each other, and said at least one standard supplement figure consists of a single standard supplement figure which partially overlaps each of the connected two basic figures in said predetermined relation therewith, said output figure processing means producing the output figure data representative of the overlapped two basic figures and single standard supplement figure as said output figure.

6. A data processing apparatus according to claim 2, wherein said at least one basic figure is a rectangular basic figure having a predetermined width as said characteristic, and said determining means determines as said at least one standard supplement figure a circle whose diameter is equal to said predetermined width, said preparing means preparing the standard supplement data representative of said circle such that a center of said circle is aligned with a middle point on one of opposite sides of rectangle of said rectangular basic figure.

7. A data processing apparatus according to claim 2, wherein said at least one basic figure consists of two rectangles which have a predetermined width and which are connected to each other such that a middle point on one of opposite sides of one of said two rectangles is aligned with a middle point on one of opposite sides of the other of said two rectangles, said determining means determining as said at least one standard supplement figure a circle whose diameter is equal to the predetermined width of said two rectangles as said characteristic, said preparing means preparing the standard supplement data representative of said circle such that a center of said circle is aligned with said middle points of said two rectangles.

8. A data processing apparatus according to claim 7, wherein said output figure processing means modifies said overlapped two rectangles and said circle along mutually perpendicular X and Y axes by two different magnifications, respectively, so that said two rectangles are converted into respective parallelograms while said circle is converted into an ellipse whose ellipticity is determined by a ratio of one of said different magnifications to the other magnification.

9. A data processing apparatus according to claim 1, wherein each of said basic figure data and said standard supplement figure data consists of dot data consisting of data bits which correspond to picture elements on said output medium, the data bits corresponding to said inside-indicating data being set to indicate image dots to be formed at the picture elements which lie inside said output figure.

10. A data processing apparatus according to claim 9, further comprising a dot map memory for storing said dot data.

11. A data processing apparatus according to claim 1, wherein said inside-indicating data comprise a data bit "1" while said outside-indicating data comprise a data bit "0", said output figure processing means producing said output figure data by logical addition of said basic figure data and said standard supplement figure data.

12. A method for preparing output figure data used to output an output figure containing at least one basic figure, on an output medium such as a recording medium and a display screen, said method comprising the steps of:

preparing basic figure data necessary to output said at least one basic figure on said output medium;

determining, by utilizing a control program defining at least one standard supplement figure with respect to a shape and a size thereof and a relative position thereof to said at least one basic figure so as to partially overlap said at least one basic figure in a predetermined relation therewith and a characteristics of said at least one basic figure, a size and a position of said at least one standard supplement figure;

preparing standard supplement figure data necessary to output said at least one standard supplement figure on said output medium, each of said basic figure data and said supplement figure data consisting of inside-indicating data indicating an area inside a corresponding one of said basic figure and said standard supplement figure, and outside-indicating data indicating an area outside said corresponding one of the basic figure and the standard supplement figure; and processing said basic figure data and said standard supplement figure data into the output figure data representing the overlapped at least one basic figure and at least one standard supplement figure as said output figure, such that an area inside said output figure is indicated by said inside-indicating data and an area outside the output figure is indicated by said outside-indicating data, said output figure containing at least one supplemental figure which is a portion of said at least one standard supplement figure. at least one basic figure, a size and a position of said at least one standard supplement figure;

preparing standard supplement figure data necessary to output said at least one standard supplement figure on said output medium, each of said basic figure data and said supplement figure data consisting of inside-indicating data indicating an area inside a corresponding one of said basic figure and said standard supplement figure, and outside-indicating data indicating an area outside said corresponding one of the basic figure and the standard supplement figure; and processing said basic figure data and said standard supplement figure data into the output figure data representing the overlapped at least one basic figure and at least one standard supplement figure as said output figure, such that an area inside said output figure is indicated by said inside-indicating data and an area outside the output figure is indicated by said outside-indicating data, said output figure containing at least one supplemental figure which is a portion of said at least one standard supplement figure.

13. A data processing apparatus comprising:

basic figure processing means for preparing basic figure data necessary to output two basic figures connected to each other, on an output medium such as a recording medium and a display screen;

supplemental figure processing means for determining, by utilizing a characteristic of said basic figures, two standard supplement figures each one of which extends from a corresponding one of the connected two basic figures in a predetermined relation therewith so as to partially overlap the other standard supplement figure, and preparing supplemental figure data necessary to output on said output medium the overlapped portion of said two standard supplement figures as a supplemental figure, said supplemental figure being contiguous with each of said connected two basic figures;

each of said basic figure data and said supplemental figure data consisting of inside-indicating data indicating an area inside a corresponding one of said connected two basic figures and said supplemental figure, and outside-indicating data indicating an area outside said corresponding one of the connected two basic figures and the supplemental figure; and output figure processing means for processing said basic figure data and said supplemental figure data into output figure data used to output the contiguous two basic figures and supplemental figure as an output figure, such that an area inside said output figure inside-indicating data and an area outside said output figure is indicated by said inside-indicating data.

14. A data processing apparatus according to claim 13, wherein said two basic figures consist of two first parallelograms, and said supplemental figure processing means determines as said two standard supplement figures two second parallelograms each of which has opposite sides whose length is equal to a length of opposite sides of each of said first parallelograms, said each second parallelogram extending from one of the opposite sides of a corresponding one of said two first parallelograms such that one of said two opposite sides of said each second parallelogram is aligned with said one of said opposite sides of the corresponding one of said two first parallelograms.

15. A data processing apparatus according to claim 14, wherein said each first parallelogram consists of a rectangle, while said each second parallelogram consists of a rectangle having opposite sides whose length is equal to a width of said rectangle of said first parallelogram.

16. A data processing apparatus according to claim 13, wherein said supplemental figure processing means comprises:

means for preparing first figure data representative of one of said two standard supplement figures and second figure data representative of the other standard supplement figure, each of said first figure data and said second figure data consisting of the inside-indicating data indicating an area inside a corresponding one of said two standard supplement figures, and the outside-indicating data indicating an area outside said corresponding one of the two standard supplement figures; and means for processing said first figure data and said second figure data into said supplemental figure data such that an area inside said overlapped portion of the two standard supplement figures is indicated by said inside-indicating data and an area outside said overlapped portion is indicated by said outside-indicating data.

17. A data processing apparatus according to claim 13, wherein each of said basic figure data and said supplemental figure data consists of dot data consisting of data bits which correspond to said inside-indicating data being set to indicate image dots to be formed at the picture elements which lie inside said output figure.

18. A data processing apparatus according to claim 19, further comprising a dot map memory for storing said dot data.

19. A data processing apparatus according to claim 16, wherein said inside-indicating data comprise a data bit "1" while said outside-indicating data comprise a data bit "0", said supplemental figure processing means producing said supplemental figure data by logical product of said first figure data and said second figure data, said output figure processing means producing said output figure data by logical addition of said basic figure data and said supplemental figure data.

20. A method for preparing output figure data used to output an output figure containing two basic figures connected to each other, on an output medium such as a recording medium and a display screen, said method comprising the steps of:

preparing basic figure data necessary to output the connected two basic figures on said output medium;

determining, by utilizing a characteristic of said basic figures, two standard supplement figures each one of which extends from a corresponding one of said connected two basic figures in a predetermined relation therewith so as to partially overlap the other standard supplement figure;

preparing supplemental figure data necessary to output on said output medium the overlapped portion of said two standard supplement figures as a supplemental figure, said supplemental figure being contiguous with each of said connected two basic figures, each of said basic figure data and said supplemental figure data consisting of inside-indicating data indicating an area inside a corresponding one of said connected two basic figures and said supplemental figure, and outside-indicating data indicating an area outside said corresponding one of the connected two basic figures and the supplemental figure; and processing said basic figure data and said supplemental figure data into the output figure data representing the contiguous two basic figures and supplemental figure as said output figure, such that an area inside said output figure is indicated by said inside-indicating data and an area outside said output figure is indicated by said outside-indicating data.

* * * * *